United States Patent
Wu

[11] Patent Number: 5,495,830
[45] Date of Patent: Mar. 5, 1996

[54] VARIABLE VALVE TIMING

[75] Inventor: Ko-Jen Wu, Troy, Mich.

[73] Assignee: General Motors Corporation, Detroit, Mich.

[21] Appl. No.: 417,347

[22] Filed: Apr. 5, 1995

[51] Int. Cl.$^6$ .......................................... F01L 1/34
[52] U.S. Cl. .................. 123/90.15; 123/184.47; 123/184.54
[58] Field of Search .................. 123/90.15, 90.16, 123/90.17, 90.18, 184.47, 184.53, 184.54

[56] References Cited

U.S. PATENT DOCUMENTS

| | | | |
|---|---|---|---|
| 4,986,225 | 1/1991 | Wu et al. | 123/52 MF |
| 4,991,547 | 2/1991 | Davis et al. | 123/52 MF |
| 4,995,351 | 2/1991 | Ohkubo et al. | 123/90.15 |
| 5,018,486 | 5/1991 | Davis et al. | 123/184.47 |
| 5,129,367 | 7/1992 | Lee et al. | 123/184.54 |
| 5,140,955 | 8/1992 | Sono et al. | 123/90.15 |
| 5,224,460 | 7/1993 | Havstad et al. | 123/568 |
| 5,367,990 | 11/1994 | Schechter | 123/90.15 |
| 5,372,108 | 12/1994 | Wu | 123/311 |

*Primary Examiner*—Weilun Lo
*Attorney, Agent, or Firm*—Michael J. Bridges

[57] ABSTRACT

Intake valve timing information is provided for control and diagnostics in a variable valve timing internal combustion engine application in which check valves are disposed in intake passages connecting engine cylinders to an intake plenum for impeding backflow out of the intake passages and into the intake plenum, by timed sampling of intake passage pressure and a determination of pressure change over an intake valve closing event indicating an amount of backflow out of the cylinder and into the intake passage. The amount of backflow indicates intake valve timing as the crank angle at the time of intake valve closing.

7 Claims, 4 Drawing Sheets

1
VARIABLE VALVE TIMING

FIELD OF THE INVENTION

This invention relates to internal combustion engine variable valve timing and, more particularly, to measuring valve event timing in an engine having variable valve timing control.

BACKGROUND OF THE INVENTION

The benefits of variable valve timing to control internal combustion engine cylinder intake charge are well-established. It is further known that backflow may be prevented in variable valve timing applications through placement of check valves, such as reed valves, in the engine intake manifold. Still further, active intake charge throttling for each cylinder has been proposed using a butterfly or rotary cylinder inlet valve. The control under such mechanizations, such as that described in U.S. Pat. No. 5,372,108, requires instantaneous valve timing information. Crankshaft and camshaft phasing diagnostics may further be provided through the benefit of precise valve event timing. Absolute internal combustion engine camshaft position information, which may only be available at one camshaft angular position for each engine cycle, may be used to derive a rough approximation of valve timing in variable valve timing systems. Camshaft position sensor signal processing delays and engine speed transients can significantly reduce the accuracy of such a derivation. Indeed, the inaccuracy of the derivation may disqualify it for use in many engine control and diagnostic applications.

An approach to determining valve timing in variable valve timing engine applications with sufficient precision for application in engine control and diagnostics is therefore desirable. It is further desired that such an approach add minimal cost and complexity to current variable valve timing control and diagnostic applications.

SUMMARY OF THE INVENTION

The present invention is a desirable approach to determining valve timing in internal combustion engine variable valve timing applications as it requires minimal additional control or diagnostic hardware over that of conventional control and diagnostic systems, and as it is sufficiently accurate to support even sophisticated control and diagnostic applications.

More specifically, the approach of the present invention relies on synchronous sampling of a trapped volume pressure before and after an active engine cylinder intake valve closing event. A simple, often already available pressure transducer may be used to sample the pressure. A first pressure sample is taken when the cylinder is at a known position with a known cylinder volume. This first sample provides a baseline pressure upstream of the active cylinder between a check valve and the active cylinder intake valve. The check valve is positioned in the engine inlet air passage between an intake plenum and the cylinder intake valve. A second pressure sample is taken when the intake valve for the active cylinder is closed, such as during the active cylinder compression stroke. In typical engine applications, the active cylinder intake valve closes just after the piston in the active cylinder reaches its bottom dead center position, resulting in backflow of a volume of cylinder charge out of the cylinder and into the upstream cylinder intake passage. The reed valve in the passage will close shortly after the beginning of the active cylinder compression stroke and before the active cylinder intake valve closes, trapping the backflowing cylinder charge between the closed reed valve and the closing intake valve. The amount of delay between active cylinder bottom dead center position and the time of intake valve closing will dictate, for given engine operating conditions, the amount of charge pushed out of the cylinder past the intake valve. The backflowing charge will cause a measurable disruption in the air pressure in the region between the intake valve and the check valve. The magnitude of this disruption may be used to derive the time of active cylinder intake valve closing. The disruption is provided for by taking the first pressure sample before any backflow of the cylinder charge is likely to have occurred. The second sample is then taken after the active cylinder intake valve closes, trapping the backflowing charge between the closed check and intake valves. The change in cylinder charge volume which indicates the amount of backflowing charge during the time period between the two pressure samples, is determined directly from the pressure disruption and, after accounting for any flow losses that may have occurred, the change in cylinder charge volume is used in a direct derivation of the time of active cylinder intake valve closing, which may be expressed for convenience as the engine crankshaft angular position at the time of active cylinder intake valve closing. Precise variable valve timing diagnostics and control may be carried out using the precise engine position information, including a closed-loop valve timing control, in which a desired phase offset may be compared to the actual measured offset, and the offset error driven controllably toward zero through a classical or modern control technique. Still, further, a check valve diagnostic may be provided by comparing the pressure disruption between successive cylinder events or between events of a single cylinder to determine if the variation in the pressure disruption is acceptably small and stable.

In yet a further aspect of this invention, more than one intake valve closing event timing measurement may be made for each engine cycle simply by carrying out the pressure disruption measurement for a plurality of the cylinders of the engine. Precise phasing information may thereby be provided for use in the described control and diagnostics functions. Still further, the approach of the present invention may be self-diagnosing through a comparison of successive valve timing measurements and a determination of measurement correlation reasonableness. Unreasonably poor correlation of the timing information may indicate a fault condition arising, for example, from a pressure or synchronization inaccuracy, or from a poor seal in the system.

The precise measurement for control and diagnostics of the present invention, even when applied to determine a plurality of intake valve timing events, adds little cost to engine control and diagnostics, as the required sensors are already available on many current engine applications. The derivation of timing from the sensed pressure and the resulting control and diagnostics may be carried out through control and actuation hardware already available on many current engine applications.

BRIEF DESCRIPTION OF THE DRAWINGS

The invention may be best understood by reference to the preferred embodiment and to the drawings in which.

DESCRIPTION OF THE PREFERRED EMBODIMENT

Figure 1:
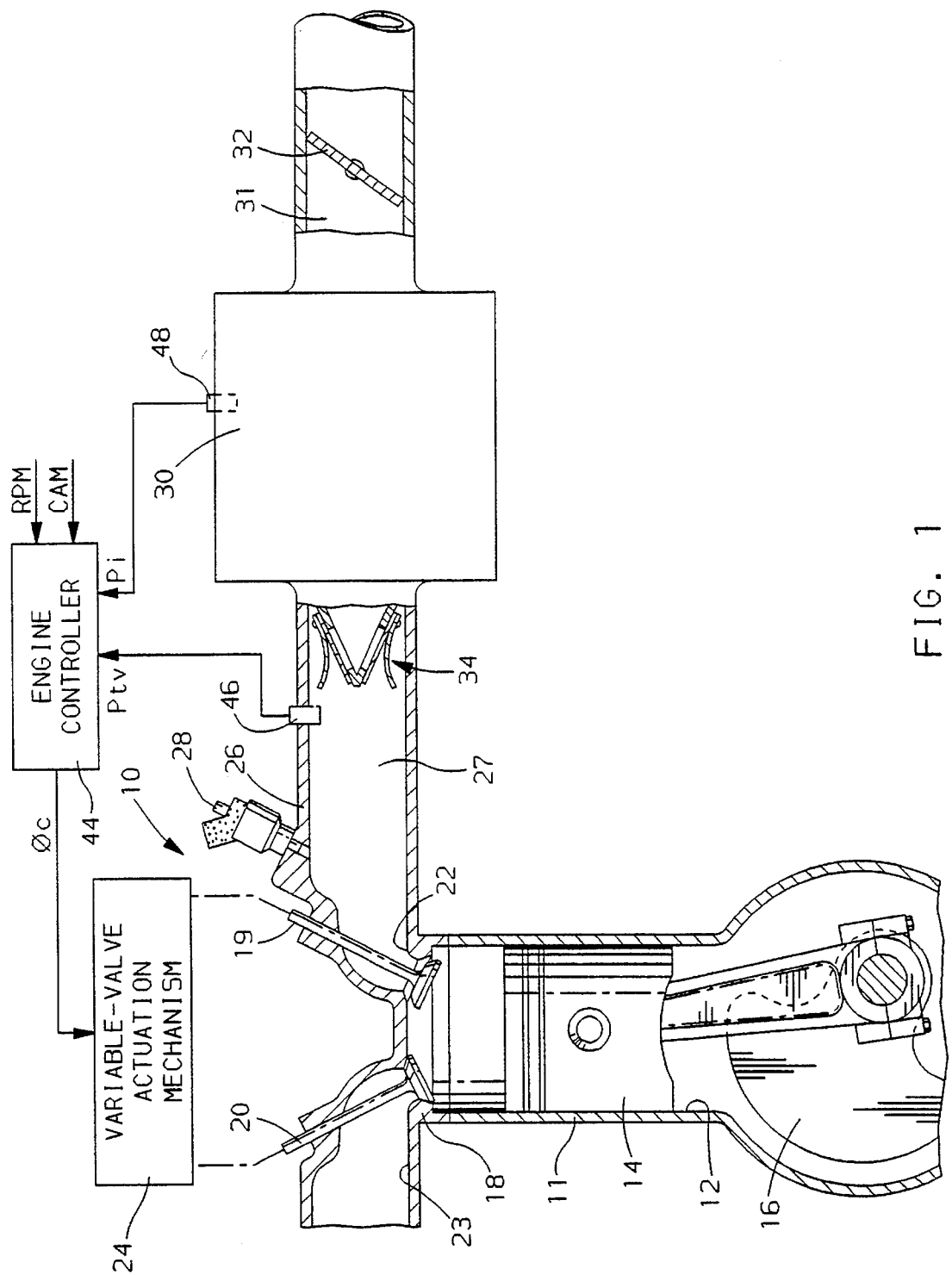
FIG. 1 is a schematic view of the variable valve timing engine application of the preferred embodiment.
Figure 2:
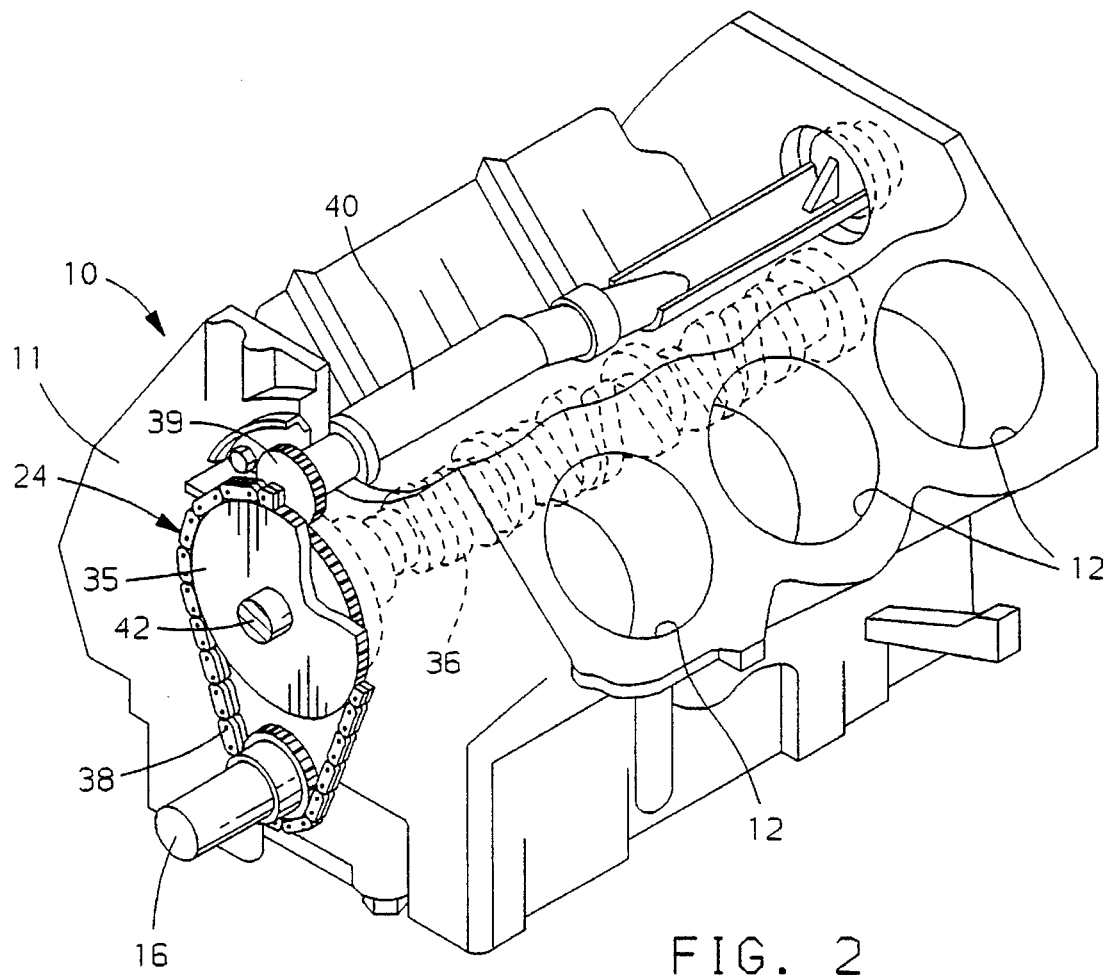
FIG. 2 is a pictorial view of portions of an engine including the variable valve timing application of the preferred embodiment.

Referring to FIG. 1, a spark ignited four stroke cycle internal combustion engine 10 includes a cylinder block 11 having multiple cylinders 12 only one being shown. Each cylinder has a piston 14 reciprocable therein and connected by a connecting rod 15 to a crankshaft 16. A cylinder head 18 closes the end of the cylinder 12 above the piston and includes at least one intake valve 19 and one exhaust valve 20 respectively controlling an intake port 22 and an exhaust port 23 connecting with the cylinder. Variable timing valve actuation means 24 are provided of any conventional type for varying the piston crank angle corresponding to an angular position of the crankshaft 16 relative to intake and exhaust valve timing corresponding to an angular position of the camshaft 36 (FIG. 2). The intake port 22 connects with a manifold runner 26 to define an intake passage 27 into which fuel is sprayed by a fuel injector 28. Upstream of the fuel injector 28 is an intake plenum 30 connecting with each of the passages 27 for each respective engine cylinder and connecting with an air intake tube 31 having a main throttle 32 of the butterfly or rotary type. An auxiliary one way or check valve 34, such as a reed valve of conventional design, is located in each of the intake passages 27 between the plenum 30 and the intake valve 19. The presence of the reed valve prevents or limits backflow of gases from the engine cylinders such as cylinder 12 into the intake manifold plenum 30 and thus permits use of camshaft phase control of the engine valves to provide for generally understood variable valve timing advantages. Conventional pressure transducer 46 is located in the intake passage 27 to sense the air pressure therein and output signal Ptv indicating the intake passage pressure. Likewise, a conventional pressure transducer 48 is located in intake plenum 30 to provide an output signal Pi indicating such pressure. The pressure signals Ptv and Pi may be continuous analog signals which are periodically sampled and interpreted by a conventional engine controller 44. Engine controller 44 may be a conventional single chip micro-controller having such generally known elements as a central processing unit, a read only memory unit, a random access memory unit, and input/output control units for communicating controller input and output information. Included with such input information in this embodiment is a signal RPM in the form of a periodic analog signal the frequency of which is proportional to the rate of rotation of the crankshaft 16, and a synchronization signal CAM generated when an engine camshaft 36 (FIG. 2) rotates past a reference angle. Signal RPM may be used to indicate engine crankshaft position occurrences corresponding, for example, to occurrence of top or bottom dead center position of the engine cylinders, and signal CAM may be used to indicate when the camshaft 36 is at a predetermined rotational angle. Engine controller 44, with benefit of the pressure signals Ptv and Pi, the signals RPM and CAM and other conventional sensor signals, provides for engine control and diagnostic operations generally understood in the art. Such operations include valve timing control operations dictated by a command φc output by the engine controller to the variable valve timing actuation means 24.

Referring to FIG. 2, mechanical portions of the variable timing valve actuation means 24 are illustrated comprising a cam phaser 35 capable of varying the phase angle of the camshaft 36, which actuates both the intake and exhaust valves 19 and 20 through conventional valve gear (not shown), relative to the phase angle of the crankshaft 16 by which the camshaft is driven. The phaser 35 is driven by the crankshaft 16 through a chain 38 and is in turn connected through a geartrain 39 to drive a balance shaft 40 at crankshaft speed with a fixed phase angle. An internal planetary gear mechanism in the phaser 35 is adjustable through a control shaft 42 to vary the camshaft phase angle. An example of a phaser of this type is found in U. S. Pat. No. 5,327,859, assigned to the assignee of this application.

Figure 3:
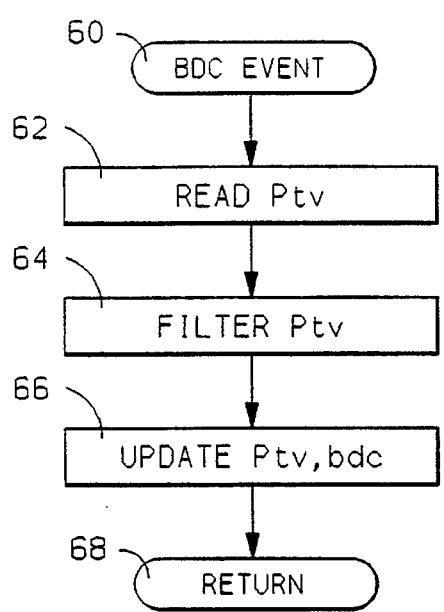
FIGS. 3 and 4 are diagrams illustrating a flow of controller operations for carrying out the valve timing analysis of the preferred embodiment using the hardware of FIG. 1.
Figure 4:
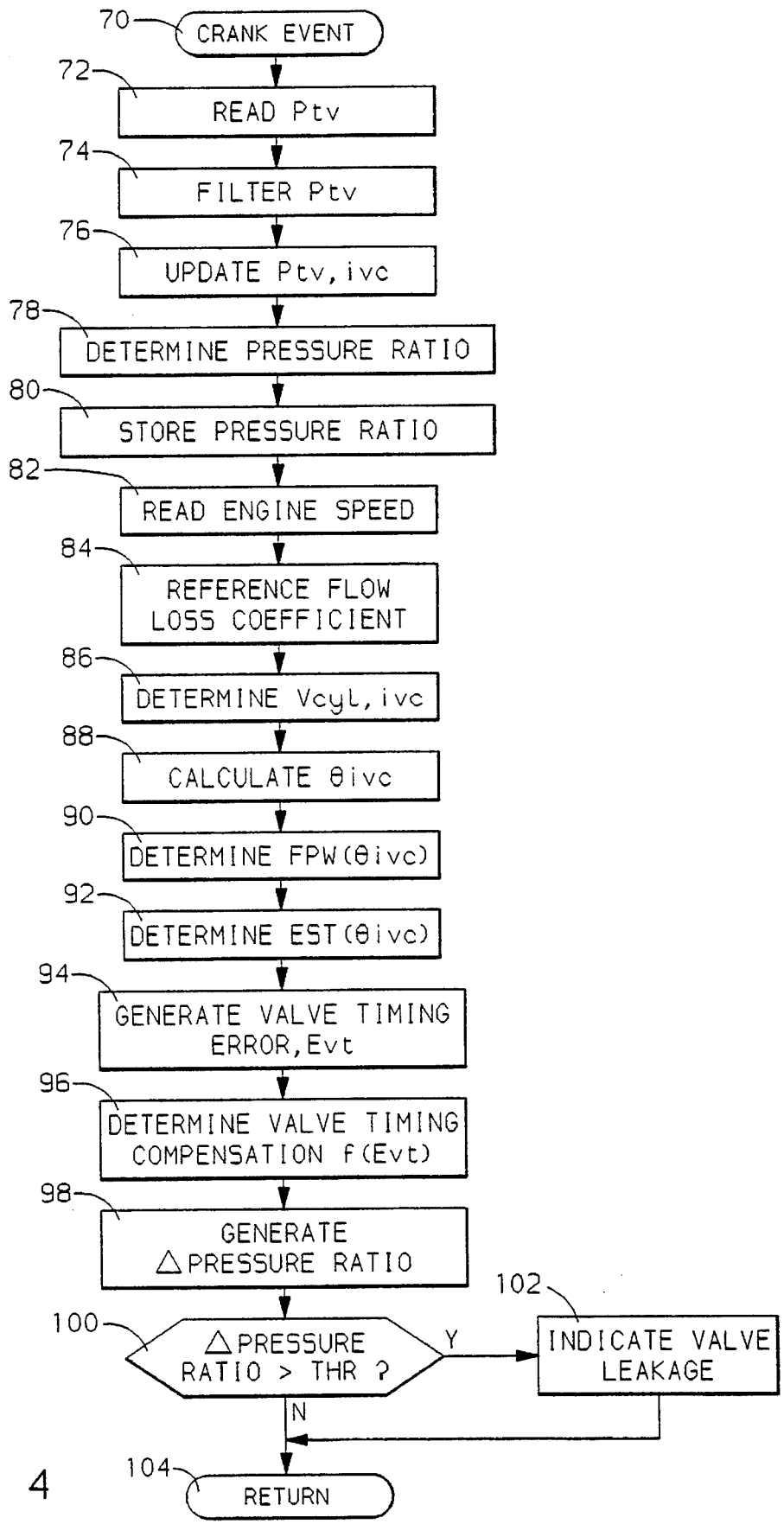

The routines illustrated in FIGS. 3 and 4 describe a sequence of engine controller operations for carrying out the intake valve timing operations of the preferred embodiment of this invention. These operations may be embodied in the form of a sequence of controller software instructions stored in a controller read only memory (not shown) and executed in a step by step manner following predetermined engine synchronization events. Generally, these routines provide for timed sampling of trapped volume pressure to determine the degree of charge backflowing out of an active engine cylinder 12 of FIG. 1 following cylinder bottom dead center position until the intake valve 19 of the active cylinder 12 reaches a closing position isolating the backflowing volume in the intake passage 27. The check valve 34 of FIG. 1 closes shortly after the cylinder bottom dead center position, blocking the path of backflow and trapping the backflowing charge. The amount of charge thus trapped indicates the precise amount of time that the cylinder compression stroke was pushing the cylinder charge up into the intake passage 27. This amount of time indicates a difference in time between occurrence of active cylinder bottom dead center position (directly corresponding to engine crankshaft angular position) and occurrence of active cylinder intake valve closing (directly corresponding to engine camshaft angular position), providing a precise measure of the actual phasing between the crankshaft and camshaft which may also be described as the intake valve timing relative to the crank angle of the piston. Such information is used in precision phasing control, fuel, air and ignition control, and diagnostics.

More specifically, the operations of FIGS. 3 and 4 provide for pressure sensing using conventional pressure transducers to determine the volume of the charge trapped, as a function of engine speed and then correct the determined volume with an engine speed dependent flow loss coefficient. The corrected volume is then applied to a predetermined function or to a conventional lookup table to determine a time of occurrence of the active cylinder intake valve closing event, expressed as the crank angle at the time of the intake valve closing event. Engine control and diagnostic operations are then carried out with benefit of the determined crank angle.

To provide for such operations, two synchronization events are required in this embodiment. First, a cylinder bottom dead center BDC event is used to trigger a baseline pressure measurement through the operations of FIG. 3, and next a cylinder crank event is used to signal a time for measuring a trapped volume pressure in accord with initial operations of the routine of FIG. 4. The pressure measurements are made under assumed substantially constant engine operating conditions, such as engine EGR and net mean effective pressure NMEP conditions, for example by minimizing the time between such measurements. In this embodiment, such time is minimized by taking the measurement samples during a single engine cycle, such as shortly before and shortly after a single intake valve closing event. In the embodiment of this invention in which a plurality of intake valve closing timing events are measured, such measurements may occur shortly before and shortly after the corresponding intake valve closing events for the current active engine cylinder.

Figure 5:
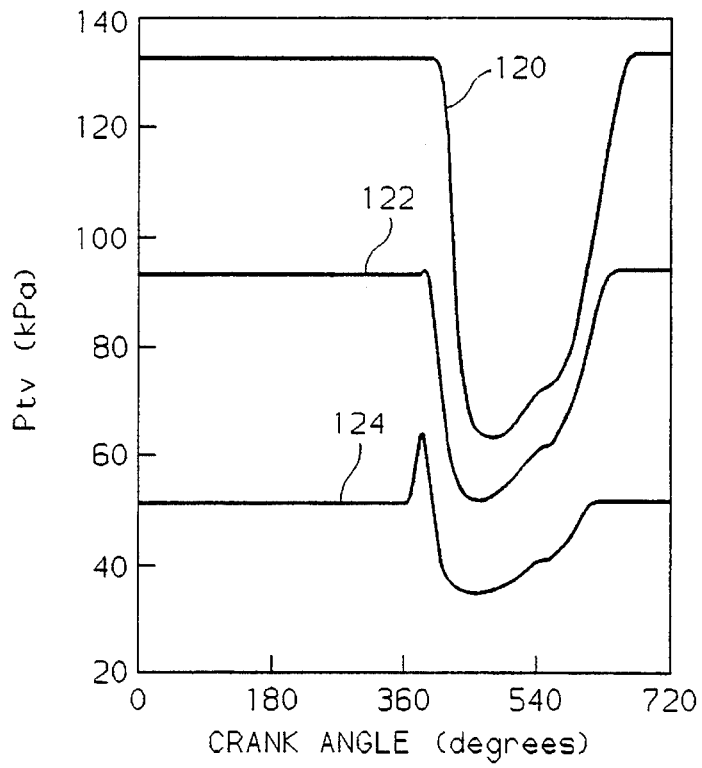
FIG. 5 is a diagram illustrating the relationship between trapped volume pressure and engine crank angle for a variety of operating conditions.

Specifically, an interrupt is generated upon occurrence of a crank event corresponding to a piston bottom dead center event. In this embodiment, a piston bottom dead center event occurs in a four cycle engine between a cylinder intake stroke and a cylinder compression stroke. Such event may also be described as occurring when the piston in an active cylinder is at its BDC position, which is the crank angle of the piston when it is fully retracted in the cylinder, providing an inlet air region in the cylinder of maximum volume. Such maximum volume is substantially constant for a given engine, and is known as a substantially constant value used for design and analysis of the engine. Upon occurrence of the bottom dead center interrupt, any ongoing controller operations are temporarily suspended and the controller is directed to carry out an interrupt service routine illustrated by the series of operations of FIG. 3, which are executed starting at a first step 60 and proceeding to a next step 62 at which Ptv is sampled. Ptv is the air pressure in intake passage 27 as output by sensor 46. It has been determined experimentally that Ptv at cylinder bottom dead center position is substantially the same as Pi,bdc which is the intake plenum pressure transduced by sensor 48 of FIG. 1, at cylinder bottom dead center position. As such, and in accord with this invention, the pressure sampled at the step 62 may be the signal Pi output from sensor 48 of FIG. 1. The signal Pi then, within the scope of this invention, would be substituted for each occurrence of the signal Ptv in the routine of FIG. 3, such as at steps 62–66, and would be used to determine the pressure ratio at step 78 of FIG. 4, to be described. After reading the pressure signal at the step 62, whether the signal Ptv from the sensor 46 in the intake passage 27 (FIG. 1) or the signal Pi from the sensor 48 in the intake plenum 30 (FIG. 1), a next step 64 is executed to filter the pressure signal through a conventional filter process at a step 64. The filter process may include a first order lag filter process for reducing the impact of sensor or signal noise on the accuracy of the pressure indicated by signal Ptv (or equivalently Pi, within this invention). The pressure signal characteristic, such as shown in FIG. 5, is not significantly changed through such lag filter process. The filtered trapped volume pressure value Ptv (or Pi) is next stored in controller random access memory at a step 66 with the label Ptv,bdc, indicating it represents the trapped volume pressure (or the plenum pressure) at cylinder bottom dead center position BDC. The routine next returns to any other operations that may be required, under conventional BDC interrupt servicing practices, to properly service the BDC interrupt. Upon completing such additional operations, the controller may exit the service routine and resume execution of any operations that may have been temporarily suspended at the time of the BDC interrupt to allow such interrupt to be serviced.

The sequence of operations illustrated by FIG. 4 make up an interrupt service routine that is executed for each occurrence of a crankshaft event that occurs only when the intake valve for the cylinder under measurement is closed. Such valve must be closed to allow a measurement of the amount of change in trapped volume in the corresponding intake passage 27. For example, the interrupt that initiates execution of the operations of FIG. 4 may be the next crank event following the BDC event that initiated the described routine of FIG. 3. This ensures the intake valve 19 (FIG. 1) will be closed and that a minimal change in engine operating conditions has occurred since the cylinder BDC event occurred that triggered the sampling of Ptv of FIG. 3.

FIG. 5 illustrates a relationship between engine crankshaft angle and trapped volume pressure over a range of engine operating conditions. Curves 120–124 illustrate the significant drop in pressure in the trapped volume upon opening of the intake valve such as intake valve 19 of FIG. 1. The curve 120 represents the relationship calibrated at engine operating conditions of about a fifty degree camshaft phase retard from a reference phase angle, a 70 kPa manifold absolute pressure in intake plenum 30 of FIG. 1, no recirculation EGR of engine exhaust for mixing with engine intake air, and a net mean effective cylinder pressure NMEP of about 330 kPa. At about 410 crank angle degrees, curve 120 illustrates the significant pressure drop in intake passage 27 occurring upon opening of the intake valve 19 (FIG. 1). The pressure remains at the same level as the manifold absolute pressure at cylinder bottom dead center position, which is the 540 degree position in FIG. 5, at which position the pressure in intake passage is sampled through execution of the operations of FIG. 3, yielding the value Ptv,bdc. The pressure stabilizes at about 660 crank angle degrees when the intake valve closes. The pressure remains at a stable value until the next intake valve opening, during which time the routine of FIG. 4 may be executed to sample pressure and determine the precise time of intake valve closing in accord with this invention.

Curve 122 represents the relationship between crank angle and trapped volume pressure for the engine operating conditions of about 30 degrees of camshaft phase retard from the reference position, an absolute pressure in intake plenum 30 of about 60 kPa, no EGR, and an NMEP of about 379 kPa. Under these conditions, the pressure drop corresponding to intake valve opening occurs at about 390 crank angle degrees. The pressure occurring at cylinder BDC is sampled and stored as Ptv,bdc. The pressure in the intake passage 27 is again read after the intake valve closes, such as after a crank angle of about 640 degrees through the operations of FIG. 4, to be described.

Finally, curve 124 represents the pressure-angle relationship for engine operating conditions of about ten degrees camshaft phase retard from the reference position, about forty kPa of intake plenum absolute pressure, about eleven percent EGR and NMEP of about 193 kPa. Under these conditions, curve 124 illustrates an intake valve opening angle of about 370 crank angle degrees. At about 540 crank angle degrees, the cylinder BDC event occurs and the pressure Ptv,bdc is read and stored. Following intake valve closing at about 620 crank angle degrees, the pressure may again be read and the time of intake valve closing determined in accord with this invention.

Upon occurrence of an interrupt indicating the intake valve 19 (FIG. 1) is closed, such as the crank event following the event indicating active cylinder bottom dead center position, any current controller operations of sufficiently low priority are temporarily suspended and the operations of FIG. 4 executed starting at a step 70 and proceeding to a step 72 to read the trapped volume pressure signal Ptv provided by pressure transducer 46 of FIG. 1. The Ptv value may next be filtered at a step 74 through a conventional first order lag filter process, for example to minimize the effect of sensor and signal noise on signal accuracy.

The filtered value may then be used to update a stored trapped volume pressure value for the active cylinder at a step 76 by storing the sensed pressure as Ptv, ivc in controller random access memory. The trapped volume pressure is next used at a step 78 to determine a pressure ratio as the ratio of Ptv, ivc to Ptv,bdc.

Figure 6:
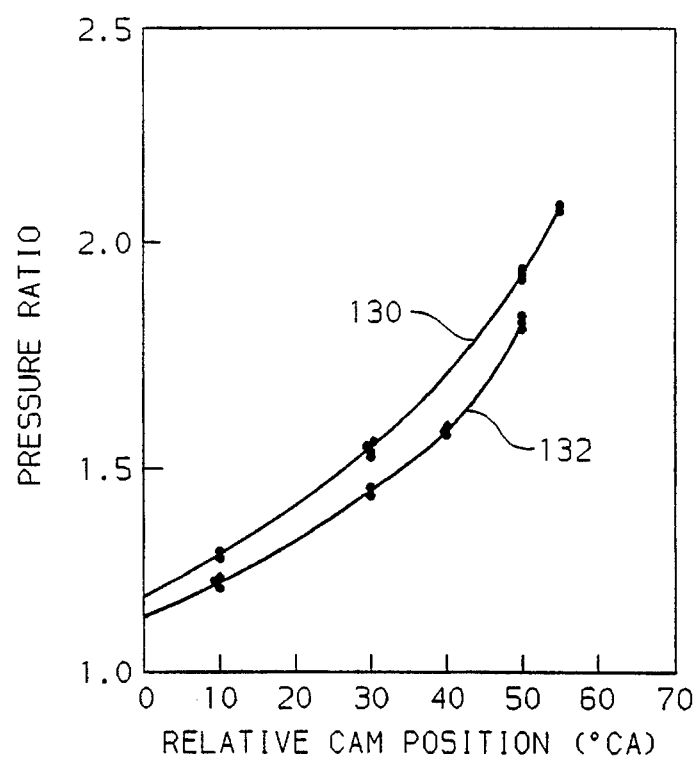
FIG. 6 is a diagram illustrating a relationship between a pressure ratio and relative engine cam angle.

Referring to FIG. 6, a relationship between CAM retard or relative CAM position and the pressure ratio determined at the step 78 at the FIG. 4 is illustrated at first and second representative engine speed values. The relationship of FIG. 6 illustrates a number of determined pressure ratios for CAM retard positions indicating a correlation between the pressure ratio and the CAM retard over a number of measurement values. Curve 130 illustrates the relationship for an engine speed of about 1500 RPM, and curve 132 represents the relationship for an engine speed of about 2200 RPM. The measurements made for a given engine at varying CAM retard values indicate a stable pressure ratio that is a function substantially of only camshaft position and is substantially insensitive to intake plenum pressure or an amount of EGR. Accordingly, as FIG. 6 illustrates, pressure ratio is a robust indicator of camshaft angular position relative to crankshaft angular position and thus is a robust measure of the engine events, such as valve events corresponding to actual cam position in accord with this invention.

Furthermore, the pressure ratio for a given camshaft angular position relative to the crankshaft angular position should not vary for a great number of engine operating conditions and if such a variation is detected such as by comparing successive pressure ratio values, a fault condition may be present. As will be described, such fault condition may be assumed to be a leak in the check valve 34 of FIG. 1.

Returning to FIG. 4, the pressure ratio is next, at a step 80, stored in controller memory such as random access memory for use in engine control and diagnostic applications, to be described. After storing the pressure ratio, the present engine speed RPM is read at a step 82, such as from controller random access memory. Engine speed may be derived by comparing signal RPM (FIG. 1) to a threshold voltage level and generating a value proportional to the time rate that the signal RPM crosses the threshold, as is generally understood in the art. A flow loss coefficient is next referenced at a step 84 from controller non-volatile memory, such as read only memory, as a predetermined function of engine speed. The flow loss coefficient is determined through a. conventional calibration process to account for any effects of flow loss from the engine cylinder 12 into the passage 27 due to the closing intake valve 19, the irreversible combustion process in the cylinder 12, any deviation of the volume in the engine cylinder at the time of the reed valve closing to the volume in the cylinder at the time of cylinder bottom dead center position, and for trapped charge leakage. Flow loss from these causes generally depends on engine speed and through a conventional calibration process in which flow loss is measured or estimated over a range of engine speeds, a function or a conventional lookup table may be derived and stored in controller non-volatile memory, and flow loss values calculated or referenced therefrom as a function of present engine speed.

After determining the flow loss coefficient, the cylinder volume at the time of intake valve closing is determined at a next step 86 as follows:

$$Vcyl,ivc = (Vcyl,bdc + Vtv)/(e^{1/\gamma * \ln(PR/c)}) - Vtv$$

in which Vcyl,bdc is engine cylinder volume at bottom dead center position which is a calibratable constant for a given engine, Vtv is the trapped volume which is a calibratable constant for a given engine induction system, $\gamma$ is the specific heat ratio for the cylinder charge, set to about 1.35 for air, PR is the pressure ratio determined at the described step 78, and c is the flow loss coefficient determined at the described step 84.

The determination of the cylinder volume at the time of intake valve closing provides for a measure of the amount of charge lost into the intake passage 27 due to the delay between the time of cylinder bottom dead center position and intake valve closing. The amount of this delay is directly related for a given engine to the amount of charge lost through backflow into the passage 27 and therefore to the amount of time between the known time of cylinder bottom dead center event to the unknown time of the intake valve closing. Accordingly, the cylinder volume at the time of intake valve closing may be used to measure the difference in time between the bottom dead center and intake valve closing and therefore the absolute time of the intake valve closing in accord with a critical feature of this invention.

Returning to FIG. 4, after determining cylinder volume at intake valve closing at the step 86, the crank angle position $\theta$ at the time of intake valve closing may next be determined at a step 88 from simple algebraic manipulation of the following equation:

$$Vcyl,ivc = \pi*B^2/4 * \{2*T+CH-(T*\theta^2/2)*(1-T*(1-\theta^2/6)^2/CRL)\}$$

in which Vcyl,ivc is the volume determined at the step 86, B is cylinder bore diameter (a measurable constant), T is crank throw which is half of engine stroke, CH is piston clearance height which is the distance between the top of a piston and the bottom of a cylinder head when the piston is at top dead center position for a pancake chamber design of common cylinder to cylinder compression ratio (a measurable constant), and CRL is connecting rod length (a measurable constant).

Accordingly, the angle $\theta$ at intake valve closing is determined, which may be used for engine control and diagnostics. Specifically, the fuel pulse for the variable valve timing engine control application of the present embodiment may be determined as a predetermined function of $\theta$ (i.v.c.) for precise fuel delivery control at a step 90 in accord with generally understood variable valve timing control practices. It is well-established that engine performance and emissions depend significantly on the relationship between fuel injection timing for a port fuel injection application and the time of cylinder intake valve opening and closing. Furthermore, at a next step 92, ignition timing commands may be determined as a predetermined function of, among other generally known parameters, $\theta$ (i.v.c.) so that fuel injection timing, cylinder inlet air control and ignition of the cylinder charge may be properly coordinated in accord with generally understood engine control principles. A command EST, indicating the time of ignition of at least an active engine cylinder is thus generated to be output to a conventional ignition driver (not shown) of an engine cylinder. Beyond the fuel and ignition control operations generally outlined at the steps 90 and 92, other engine control functions may generally understood in the art of variable valve timing engine control applications, for example, EGR valve control applications, may make use of the engine absolute position measurement provided at the step 88. For example, closed loop valve timing control may be provided by proceeding to a step 94 to generate a valve timing error Evt as a difference between the generated valve timing information provided through the sequence of operations of FIGS. 3 and 4 and a commanded valve position such as a command $\phi c$ issued by engine controller 44 to the variable valve timing mechanism 24 of FIG. 1. The valve timing error represents the difference between the desired and actual valve timing and may be applied to a conventional control function to controllably drive the error toward zero providing a more precise engine valve timing control. Specifically, the valve timing error value Evt may be applied at a next step 96 to a predetermined control function, such as, for example, a classical control function or a control function generated through modern control techniques to determine valve timing compensation which would be applied to the valve command φc to drive the actual valve position toward the commanded position in a controlled manner. The compensation value determined at a step 96 would then be applied through the conventional valve control function of the present embodiment to properly drive the variable valve timing mechanism 24 of FIG. 1.

Beyond the control functions to which the valve timing information yielded through the principals of this invention are provided, certain diagnostic operations may be carried out with benefit of the precision valve timing information. For example, a check valve diagnostic may be provided by generating a Δpressure ratio at a next step 98 as a difference between the pressure ratio determined and stored at the steps 78 and 80 and the pressure ratio determined for a prior execution of the routine of FIG. 4, such as for a neighboring engine cylinder or for a common engine cylinder during a prior engine cycle. For example, for a given engine, the pressure ratio determined for any engine cylinder such as determined at the step 78 of FIG. 4 should remain substantially constant under varying engine conditions. If the pressure ratio varies from prior determined ratios for a given engine, it may be assumed that a leak has occurred in the trapped volume and it is assumed in this embodiment that the check valve 34 of FIG. 1 is the source of the leak. Accordingly, a diagnostic of the check valve 34 is provided through a simple comparison of pressure ratios between engine cylinders or for a given engine cylinder between engine cycles. Specifically, after carrying out any engine control operations benefiting from the precise engine absolute position detection and timing of the present embodiment, a Δpressure ratio value is generated at a next step 98 as a difference between the pressure ratio stored at the step 80 and a prior stored pressure ratio either from a different engine cylinder or from the same engine cylinder during a prior engine cycle. The Δpressure ratio is next compared to a threshold delta pressure ratio value THR at a step 100. THR may be determined through a conventional calibration process as, for a given engine, the maximum tolerable variation of pressure ratios over a wide range of engine operating conditions. Any Δpressure ratio exceeding the calibrated threshold at the step 100 would therefore indicate a leak likely from the check valve 34 of FIG. 1. When such a leak is detected, a next step 102 would be executed to indicate such a fault condition either by storing a fault code in a controller memory or by illuminating an indicator in view of a vehicle operator. After indicating any such valve leak fault condition, or if no such leak was detected, a step 104 is executed to return to any operations that the engine controller 44 of FIG. 1 was carrying out at the time of the crank event that initiated the current execution of the routine of FIG. 4.

The preferred embodiment for the purpose of explaining this invention should not be taken as limiting or restricting this invention since many modifications may be made through the exercise of ordinary skill in the art without departing from the scope of this invention.

The embodiments of the invention in which a property or privilege is claimed are described as follows:

1. In an internal combustion engine having at least one cylinder with an intake valve which opens to allow inlet air passing through an intake air passage having a check valve to enter the cylinder, the cylinder having a piston disposed therein and coupled to a crankshaft for timed reciprocation, the timing of the intake valve being variably controlled relative to the crank angle of the piston, a method of determining the intake valve timing relative to the crank angle of the piston, comprising the steps of:

determining when the piston is substantially at a predetermined crank angle providing an inlet air region within the cylinder of a known volume;

sampling pressure in the intake air passage between the check valve and the intake valve when the piston is determined to substantially be at the predetermined crank angle;

while the intake valve is closed, sampling pressure in the intake air passage;

determining the intake valve timing as a predetermined function of the samples of pressure.

2. The method of claim 1, wherein the predetermined crank angle is a piston bottom dead center crank angle characterized by a fully retracted piston within the cylinder, providing an inlet air region within the cylinder of maximum volume.

3. The method of claim 1, further comprising the step of:

while the intake valve is closed, determining a deviation in inlet air region volume within the cylinder away from the known volume as a predetermined function of the samples of pressure;

and wherein the step of determining the intake valve timing determines the timing as a predetermined function of the deviation in volume away from the known volume.

4. In an internal combustion engine having at least one cylinder with an intake valve which opens to allow inlet air passing through an intake air passage having a check valve to enter the cylinder, the cylinder having a piston disposed therein and coupled to a crankshaft for timed reciprocation, the timing of the intake valve relative to the crank angle of the piston being variably controlled, a method of determining the time of intake valve closing relative to the crank angle of the piston, comprising the steps of:

when the piston is approximately at a predetermined crank angle at which the cylinder intake volume is substantially known, sampling air pressure in the intake passage between the check valve and the intake valve;

when the intake valve is closed, sampling air pressure in the intake passage;

calculating a pressure ratio between the samples of air pressure;

determining a decrease in cylinder intake volume from the substantially known volume to the cylinder intake volume when the intake valve is closed, as a predetermined function of the pressure ratio;

generating a crank angle difference between the predetermined crank angle and the crank angle at the time of intake valve closing as the amount of crank angle required to displace a volume substantially corresponding to the determined decrease in cylinder intake volume out of the cylinder and into the intake air passage; and calculating the crank angle at the time of intake valve closing to indicate time of intake valve closing relative to crank angle of the piston, by combining the generated crank angle difference with the predetermined crank angle.

5. The method of claim 4, wherein the predetermined crank angle is a piston bottom dead center angle characterized by a maximum cylinder intake volume.

6. The method of claim 4, wherein the engine further comprises an intake plenum for distributing inlet air to the intake air passage, and wherein the check valve is positioned in the intake air passage between the intake plenum and the intake air valve to impede backflow from the intake air passage to the intake plenum, and further wherein the step of sampling air pressure while the intake valve is closed samples the air pressure in the intake plenum while the intake valve is closed.

7. In an internal combustion engine having at least one cylinder with an intake valve which opens to allow inlet air and inlet fuel passing through an intake air passage having a check valve to enter the cylinder, the cylinder having a piston disposed therein and coupled to a crankshaft for timed reciprocation, the timing of the intake valve relative to the crank angle of the piston being variably controlled, a method of determining the time of intake valve closing relative to the crank angle of the piston, comprising the steps of:

when the piston is approximately at a predetermined crank angle at which the cylinder intake air and fuel volume is substantially known, sampling pressure in the intake passage between the check valve and the intake valve;

when the intake valve is closed, sampling pressure in the intake passage;

calculating a pressure ratio between the samples of pressure;

estimating an amount of backflow of intake air and fuel out of the cylinder and into the intake passage as a predetermined function of the calculated pressure ratio;

generating a crank angle difference between the predetermined crank angle and the crank angle at the time of intake valve closing as the amount of crank angle required to displace the estimated backflow amount of fuel and air out of the cylinder; and calculating the crank angle at the time of intake valve closing to indicate time of intake valve closing relative to crank angle of the piston, by combining the generated crank angle difference with the predetermined crank angle.

* * * * *